US007003156B1

(12) United States Patent
Yamamoto et al.

(10) Patent No.: US 7,003,156 B1
(45) Date of Patent: Feb. 21, 2006

(54) OBJECT DETECTION METHOD AND A VIDEO DATA RETRIEVAL METHOD

(75) Inventors: Koji Yamamoto, Kanagawa-ken (JP); Osamu Hori, Kanagawa-ken (JP); Toshimitsu Kaneko, Kanagawa-ken (JP); Takeshi Mita, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/493,013

(22) Filed: Jan. 28, 2000

(30) Foreign Application Priority Data

Jan. 29, 1999 (JP) ............................... P11-022372

(51) Int. Cl.
  G06K 9/00 (2006.01)
  G06K 9/36 (2006.01)
  G06K 9/46 (2006.01)
  H04N 7/173 (2006.01)
  H04N 7/16 (2006.01)

(52) U.S. Cl. ...................... 382/181; 382/236; 725/115; 725/145

(58) Field of Classification Search ................ 382/181, 382/107, 236, 276, 282, 283, 305, 306; 725/115; 725/145; 348/135, 154, 155; 715/967, 968; 707/4, 6
See application file for complete search history.

(56) References Cited

U.S. PATENT DOCUMENTS

| 5,581,276 | A | * | 12/1996 | Cipolla et al. ............... 345/156 |
| 5,684,715 | A | * | 11/1997 | Palmer ....................... 348/473 |
| 5,930,378 | A | * | 7/1999 | Kubota et al. ............... 382/107 |
| 6,014,461 | A | * | 1/2000 | Hennessey et al. .......... 382/195 |
| 6,278,466 | B1 | * | 8/2001 | Chen ........................... 345/473 |
| 6,335,985 | B1 | * | 1/2002 | Sambonsugi et al. ........ 382/190 |
| 6,377,296 | B1 | * | 4/2002 | Zlatsin et al. ............... 348/143 |
| 6,404,901 | B1 | * | 6/2002 | Itokawa ....................... 382/103 |
| 6,411,724 | B1 | * | 6/2002 | Vaithilingam et al. ....... 382/100 |
| 6,445,409 | B1 | * | 9/2002 | Ito et al. ..................... 348/155 |
| 6,564,263 | B1 | * | 5/2003 | Bergman et al. ............ 709/231 |
| 6,587,574 | B1 | * | 7/2003 | Jeannin ....................... 382/107 |
| 6,594,386 | B1 | * | 7/2003 | Golshani et al. ............ 382/166 |

OTHER PUBLICATIONS

Akio Yoneyama, et al., "Moving Object Detection from MPEG Video Stream", IEICE Transactions, vol. J 81-D-II, No. 8, Aug. 1998, pp. 1776-1786.

* cited by examiner

*Primary Examiner*—Joseph Mancuso
*Assistant Examiner*—Shefali Patel
(74) *Attorney, Agent, or Firm*—Oblon, Spivak, McClelland, Maier & Neustadt, P.C.

(57) ABSTRACT

A video data description method. Both feature data of predetermined object and feature data of background area are extracted from a frame of input video. The feature data of predetermined object and the feature data of background area are described as a descriptor of the frame.

10 Claims, 14 Drawing Sheets

*FIG. 9A*     FRAME i

*FIG. 9B*     FRAME (i+1)

*FIG. 9C*     FRAME (i+2)

*FIG. 10A*

OBJECT FEATURE
- POSITION
- OUTWARD FORM
- AFFINE TRANSFORMATION COEFFICIENT
- AVERAGE, DIRECTION OF MOVING VECTOR
- COLOR HISTOGRAM

*FIG. 10B*

BACKGROUND FEATURE
- AFFINE TRANSFORMATION COEFFICIENT
- AVERAGE, DIRECTION OF MOVING VECTOR
- CAMERA-WORK
- COLOR HISTOGRAM

OBJECT DETECTION METHOD AND A VIDEO DATA RETRIEVAL METHOD

FIELD OF THE INVENTION

The present invention relates to an object detection method and a video data retrieval method to retrieve a predetermined object or a frame including the predetermined object from a plurality of frames by referring to a descriptor of the frame.

BACKGROUND OF THE INVENTION

Recently, by multi-channel broadcast in proportion to digital satellite broadcast and cable television, video data obtained by a user greatly increase. On the other hand, because of progress in computer techniques and a realization of large capacity recording medium such as DVD, video data may now be stored as digital information and easily processed by the computer.

In order for the user to actually utilize the video data, an effective retrieval technique is necessary to retrieve the user's desired video from the large number of video data. As such kind of retrieval technique, some information is attached to each object in video data and the video data including the object matched with the user's necessary information is retrieved to supply audio-visual data to the user. In order to attach the information to the object in video data, processing to extract the object from the video is necessary. However, while the video data greatly increases, the user's manual operation to extract the object is not effective.

As for automatic detection technique of the object, a method to extract the object from video whose background area does not move is well known. However, in this method, it is assumed that the background area stands still. In case of moving the background area in proportion to moving the camera, it is difficult to detect the object from the video.

In short, if an outward form of the object is previously known but the background movement is not previously known, in case of retrieving the object by using the movement of the object, the retrieval is not correctly executed by effect of camera-work. For example, when an object moving to the left side is followed by the camera, the object almost stands still in a frame and the background moves to the right side in the frame. Therefore, the frame including the object moving to the left side is not retrieved from the video data.

As mentioned-above, in the prior art, the object is not correctly detected from the frame including the background relatively moving. Furthermore, the frame including such kind of object is not retrieved.

SUMMARY OF THE INVENTION

It is an object of the present invention to provide an object detection method to detect an object from video data including a background relatively moving.

It is another object of the present invention to provide a video data retrieval method to retrieve the frame including the object from a plurality of frames including the background relatively moving.

According to the present invention, there is provided an object detection method, comprising the steps of: extracting a moving vector of each block from input video data including a background area and at least one object area; estimating a movement of the background area in the video data by referring to the moving vector; eliminating the estimated movement of the background area from the video data; and detecting the object area by referring to the moving vector in the video data from which the movement of the background area is eliminated.

Further in accordance with the present invention, there is also provided a video data description method, comprising steps of: extracting feature data of predetermined object and feature data of background area from a frame of the input video; describing the feature data of predetermined object and the feature data of background area respectively as a descriptor of the frame.

Further in accordance with the present invention, there is also provided a video data retrieval method, comprising steps of: describing feature data of predetermined object and feature data of background area for each frame in a plurality of frames; inputting feature data of retrieval object; calculating a difference between the feature data of background area and the feature data of predetermined object; comparing the difference with the feature data of retrieval object; and retrieving the predetermined object or the frame including the predetermined object matched with the retrieval object from the plurality of frames according to the comparison result.

DETAILED DESCRIPTION OF THE PREFERRED EMBODIMENT

In the first embodiment of the present invention, three functions are supplied to the user. First, in addition to a function of playing the video data, the moving object is automatically detected from the video data and the object is synthetically displayed by overlapping with a figure such as an ellipse or a rectangle in order to inform the existence of the object to the user. Second, the feature data of the detected object and the feature data of the background are separately described in an external file as the descriptor. The feature data of the detected object includes a position, an outward form, and movement information of the object. Third, feature data of retrieval object is input from outside by the user. This input feature data is compared with the feature data of the object in the descriptor, and the object matched with the input feature data is retrieved from the video data in order to present to the user.

Figure 1:
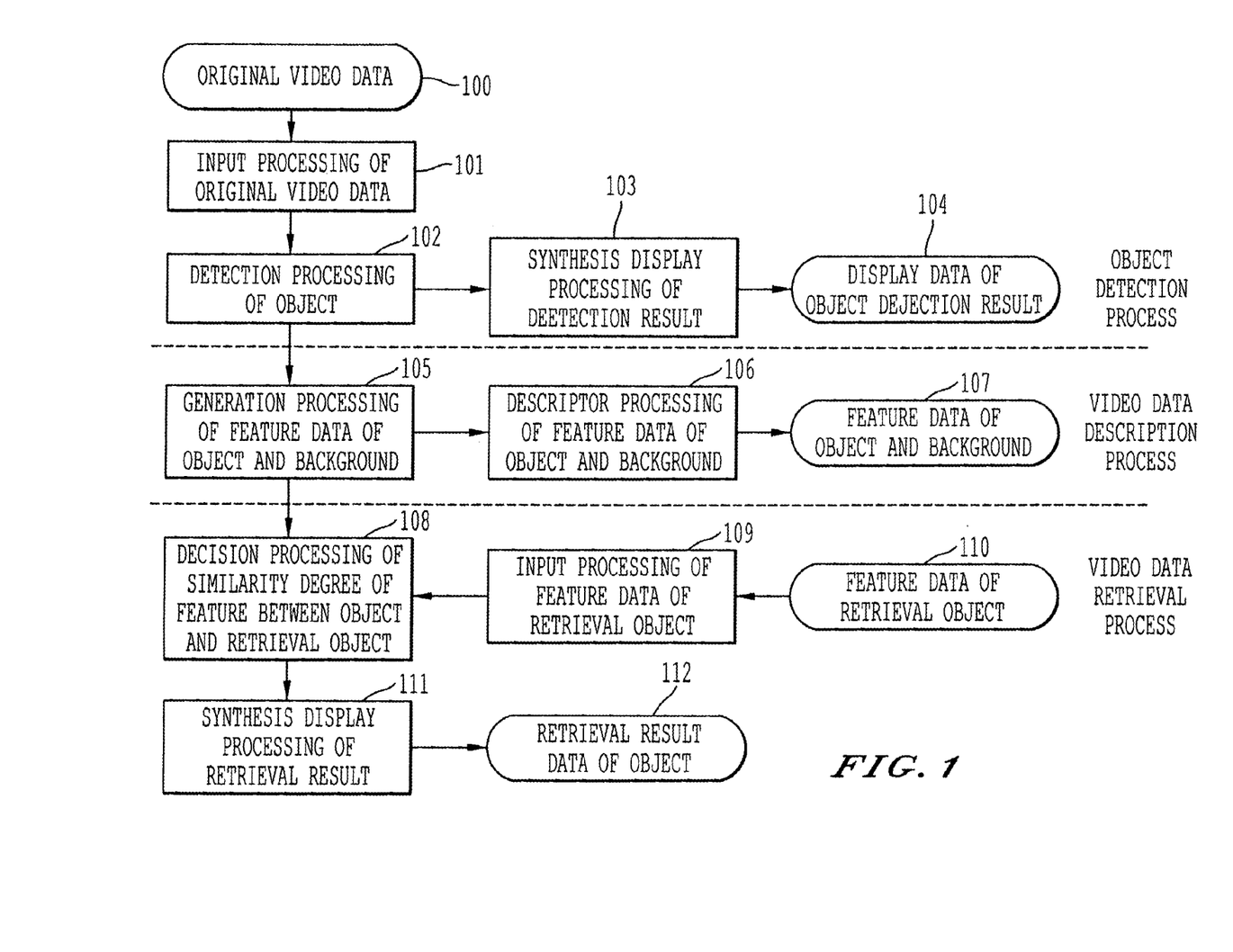
FIG. 1 is a flow chart of processing of a video retrieval system according to a first embodiment of the present invention.

FIG. 1 is a flow chart of processing of the video retrieval system according to the first embodiment of the present invention. In FIG. 1, first, original video data 100 regenerated from a recording medium such DVD is input (step 101). A predetermined object is detected from the input video data 101 by a method explained afterward (step 102). In this case, the background information is additionally detected from the video data. The detected object is synthetically displayed by overlapping with an ellipse or a rectangle as the object detection result data 104 (step 103).

On the other hand, generation processing of the feature data of the detected object and the feature data of the background is executed (step 105). In this case, the position, the outward form, and the moving information of the object are detected at step 102. Then, the feature data 107 of the object and the background are described as the descriptor data (step 106). At steps 105 and 106, a difference of the feature data between the object and the background may be described in the descriptor. Furthermore, the difference data with the feature data of the object or the difference data with the feature data of the background may be described in the descriptor. As the description processing of step 106, concretely speaking, the feature data 107 is stored in various kinds of memory device or displayed. The recording medium to store the feature data 107 may be DVD to store the original video data 100 or may be another recording medium.

Next, in order to retrieve the object, a decision processing of similarity degree between the feature data of the object generated at step 105 and the feature data 110 of retrieval object input at step 109 is executed (step 108). Then, a synthesis display processing to display the decision result of the similarity degree as the retrieval result data 112 is executed (step 111). In this case, the feature data of retrieval object 110 includes at least the position, the outward form (size) and the moving information of the retrieval object.

Figure 2:
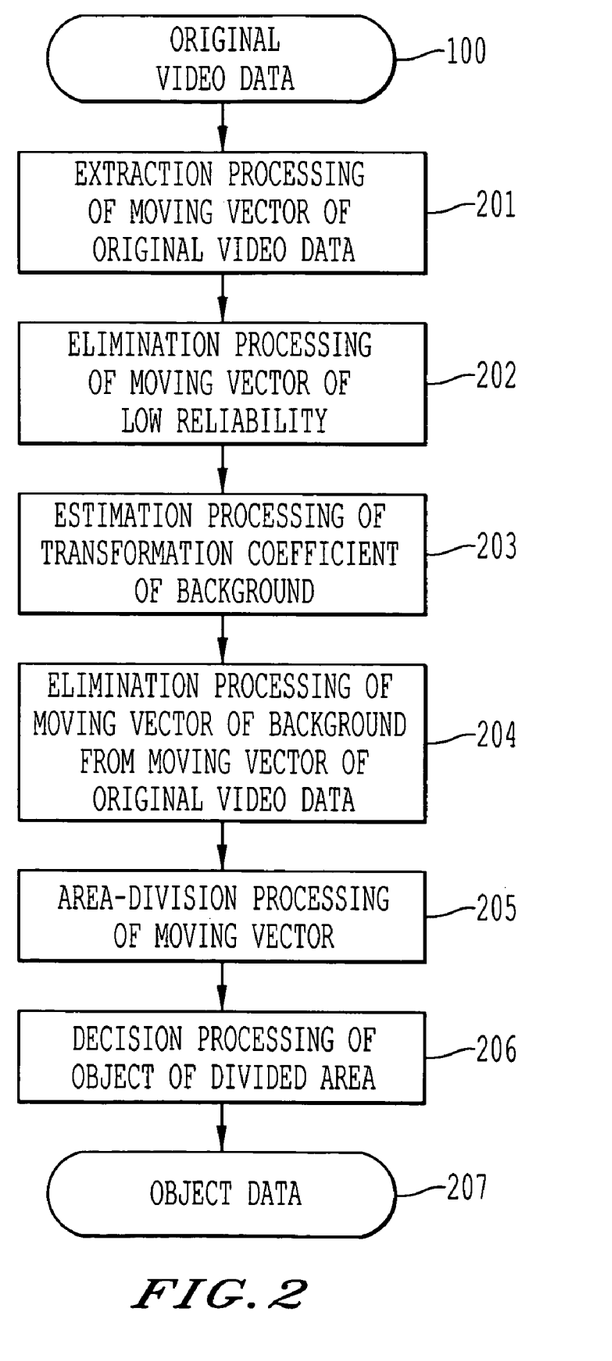
FIG. 2 is a flow chart of processing of object detection according to the first embodiment in FIG. 1.

Next, FIG. 2 is a flow chart of processing of object detection at step 102 in FIG. 1. First, a moving vector is extracted from the original video data (step 201). In case the original video data 100 is MPEG data, the moving vector obtained from P picture is used. In this case, the moving vector is obtained for each macro block in P picture. In case the original video data 100 is analog data or digital data without the moving vector, the original video data 100 is digitized if necessary. The moving vectors are extracted using optical flow from the digitized video data. Otherwise, the moving vector is extracted after the digitized video data is converted to MPEG data.

Figure 3:
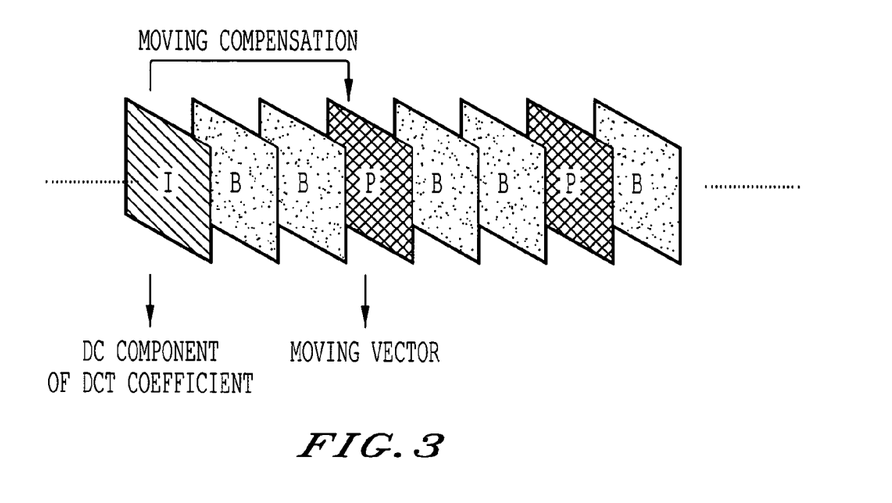
FIG. 3 is a schematic diagram showing the relation between I picture and P picture in MPEG stream.
Figure 4:
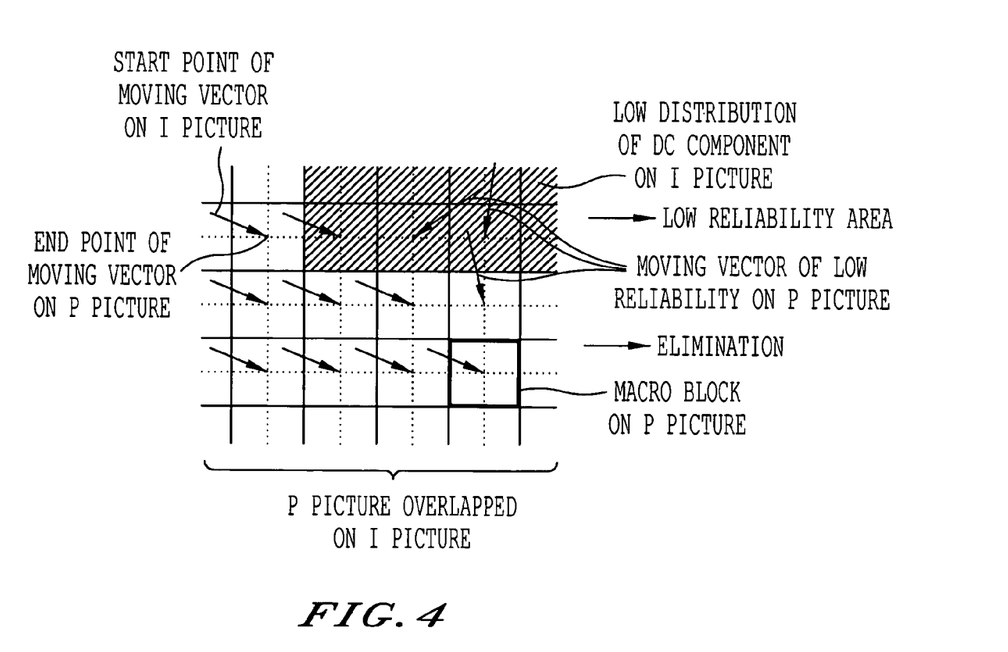
FIG. 4 is a schematic diagram showing elimination of low reliability vector on P picture.

In this extracted moving vector, actual movement of the object is often not reflected. Especially, circumference part of the frame and flat part of texture do not include the actual object movement. Therefore, the moving vector of low reliability is eliminated (step 202). First, as for the circumference part of the frame, a predetermined circumference area is set on the frame and the moving vector in the predetermined circumference area is eliminated. Second, as for the flat part of texture, in case the original video data 100 is MPEG data, DC component of DCT coefficient (discrete cosine transformation) of I picture is used as shown in FIG. 3. I picture and P picture are respectively consisted of predetermined number of macro blocks. FIG. 4 shows P picture overlapped on I picture. In each macro block of P picture, an end point of the moving vector is positioned at the center point of the macro block. A start point of the moving vector is positioned at an arbitrary point of each macro block of I picture. In each macro block of I picture, distribution of four DC components is calculated. If the distribution is below a threshold, the macro block is decided as a low reliability block as shown in oblique line area of FIG. 4. Therefore, the moving vector whose start point is positioned in the low reliability block of I picture is eliminated from P picture. In the moving vector remained in P picture, object movement includes background movement such as camera-work. In order to correctly detect the object movement, the background movement must be eliminated. Therefore, in the first embodiment, affine transformation model is used as a transformation model to approximate the background movement such as the camera-work. A transformation coefficient of the affine transformation model is estimated using the moving vector. As a result, the background movement is estimated (step 203). As estimation processing of Affine transformation coefficient, various kinds of methods are selectively used as explained afterward.

Next, the start point of each moving vector is moved as an ideal moving vector by estimated affine transformation coefficient. The ideal moving vector is subtracted from the original moving vector to eliminate the background movement (step 204). As for the moving vector from which the background movement is eliminated, the P picture is divided into areas each including similar moving vector (step 205). In short, a plurality of macro blocks whose moving vectors are almost equal are unified as one area. Concretely speaking, a direction and a size of the moving vector of one block is compared with a direction and a size of the moving vector of neighboring block on P picture. If a difference of the direction and a difference of the size are respectively below a threshold, the one block and the neighboring block are unified as one area. This processing is repeated for each combination of two neighboring moving vectors on P picture. In each area obtained at step 205, a particular area not suitable as the object is excluded by a threshold processing (step 206), and the object data 207 are finally outputted.

Hereinafter, as estimation processing of affine transformation coefficient at step 203, the following three methods are explained.

(Method 1)

Figure 5:
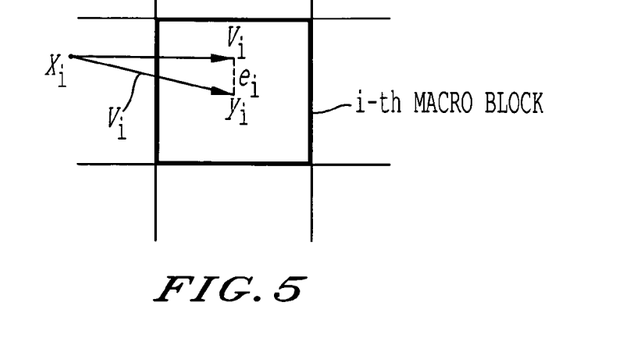
FIG. 5 is a schematic diagram showing an error between the moving vector and a vector of Affine conversion model on macro block.

In method 1, the affine transformation coefficient is estimated by the moving vectors on P picture from which the low reliability moving vectors are eliminated. As shown in FIG. 5, assume that a center point of i-th macro block is yi, the moving vector whose end point is positioned in the i-th macro block is vi, a start point of the moving vector is xi(=yi−vi), and the affine transformation coefficient is α. In this case, the start point xi is moved by the affine transformation model as the end point "ri=xi α". An error between the transformed end point ri and actual end point yi is estimated as "ei=ri−yi". A total sum of estimated error of each moving vector is represented by the following equation. The affine transformation coefficient α is calculated so that the total sum is minimized.

$$\sum_i \Psi(ei/\sigma i) = \min \quad (1)$$

A method of least squares is used in order to solve this problem. In this case, "$\Psi(z)=z^2$" is used in the equation (1). However, in the method of least squares, the moving vector of background and the moving vector of object are equally treated. As a result, affine transformation coefficient is not estimated from the moving vector of background, and the affine transformation coefficient includes the moving of object. Therefore, assume that background area is above 50% of the frame and the moving vector of object is regarded as disturbance. The affine transformation coefficient can be estimated from the moving vector of the background area. As a method strong in the disturbance, a robust estimation method is used. In this case, especially, M estimation of Biweight method is used as one robust estimation method. In the Biweight method, effect of the disturbance is reduced by decreasing the weight of element including a large error. Concretely speaking, in $\Psi(z)$ of equation (1), following equation (2) including weight "w" is used. Constant "c" is selectively set as "5~9".

$$\Psi(z) = \int wjzdz \quad (2)$$

$$wj = \begin{cases} (1-(zj/c)^2)^2 & |zj| < c \\ 0 & \text{otherwise} \end{cases} \quad (3)$$

In this way, the affine transformation coefficient of the background area is calculated. As for otherwise condition "|zj|≧c" in equation (3), the macro blocks whose moving vectors satisfy this otherwise condition are extracted from the background area on P picture. These macro blocks are regarded as the object area. Therefore, the affine transformation coefficient of the object area is calculated from the moving vectors included in these macro blocks in the same way as mentioned-above.

(Method 2)

Figure 6:
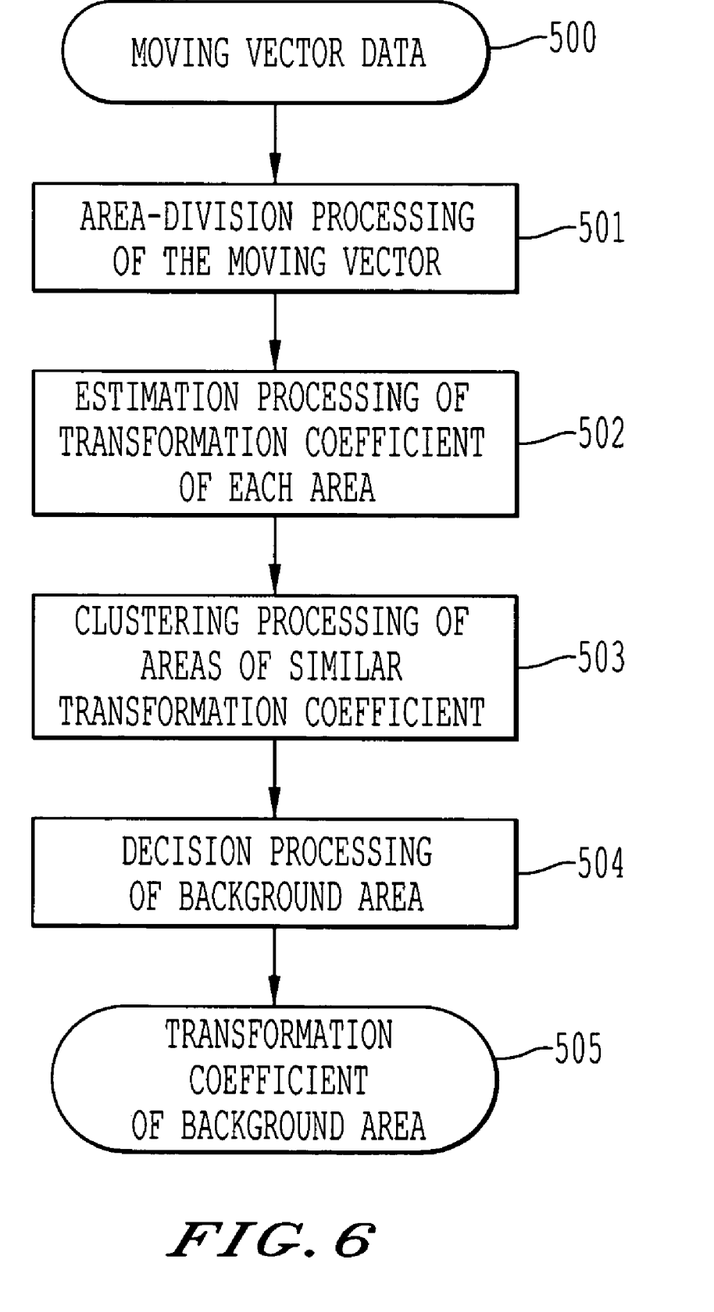
FIG. 6 is a flow chart of calculation of conversion coefficient of the background according to one method.
Figure 7:
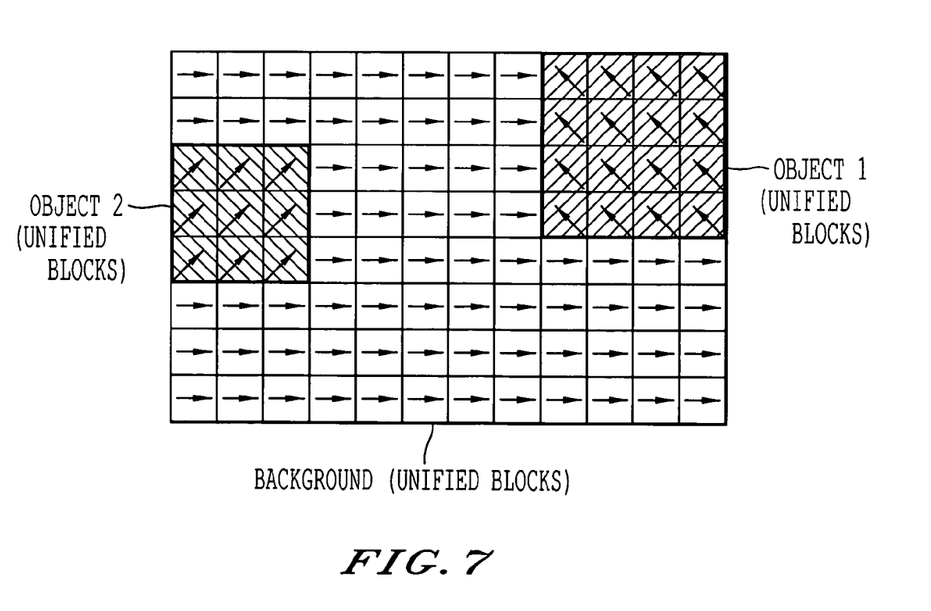
FIG. 7 is a schematic diagram showing the object and the background as unified blocks on the frame.

FIG. 6 is a flow chart of estimation processing of affine transformation coefficient according to method 2. First, as for the moving vector 500 after eliminating the low reliability vector, the P picture is divided into areas each of which includes similar moving vectors (step 501). In this case, elimination processing of moving of background is not executed. Next, by using the moving vectors included in each divided area, the affine transformation coefficient is estimated to approximate the moving of each area as an affine transformation model (step 502). In this case, robust estimation method is used in the same way as method 1. Next, clustering processing of each divided area is executed (step 503). In this case, a table stores each combination of two areas, and a distance between two areas is calculated by affine transformation coefficient. For example, Euclid distance of six coefficients of affine transformation model is used, but other kinds of distance may also be used. Next, two areas of which distance is minimum are unified, and an affine transformation coefficient is newly calculated from the unified area. These two areas are deleted from the table and the unified area is newly stored in the table as an update. This processing is repeated until a distance between two unified areas is above a threshold or only one unified area finally exists in P picture. For example, as shown in FIG. 7, the macro blocks on P picture are clustered as three unified areas. Then, a largest unified area is decided as the background area (step 504), and the affine transformation coefficient is calculated from the largest unified area. The affine transformation coefficient 505 is outputted as the transformation coefficient of the moving of the background area. In FIG. 7, the largest unified area is decided as the background area and other two unified areas are decided as two object areas.

(Method 3)

Figure 8:
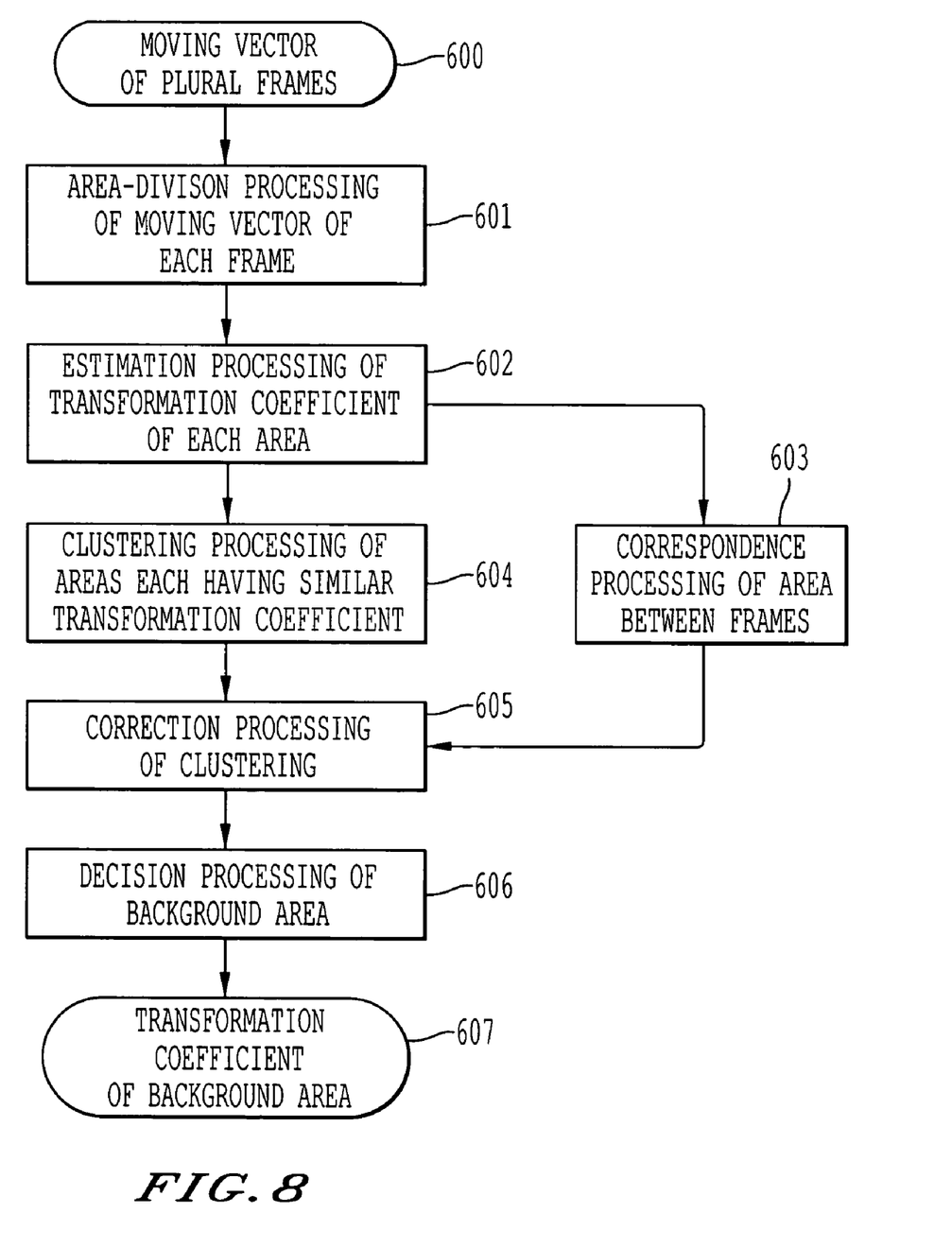
FIG. 8 is a flow chart of calculation of conversion coefficient of the background according to another method.
Figure 9A:
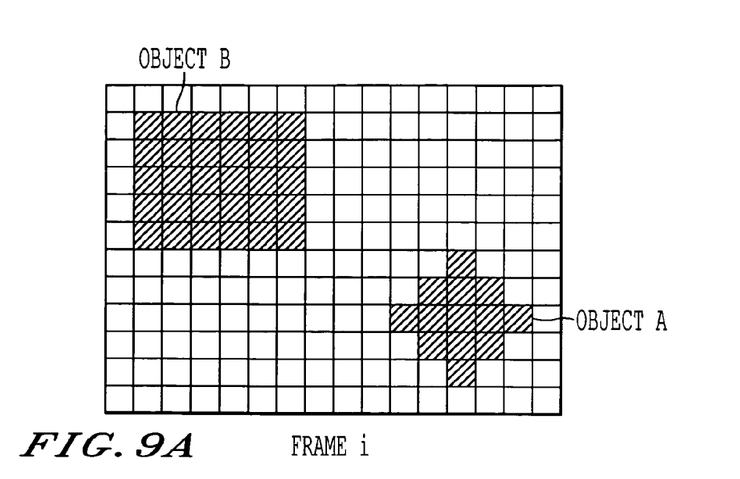
FIGS. 9A, 9B, and 9C are schematic diagrams showing correspondence of same object among three frames.
Figure 9B:
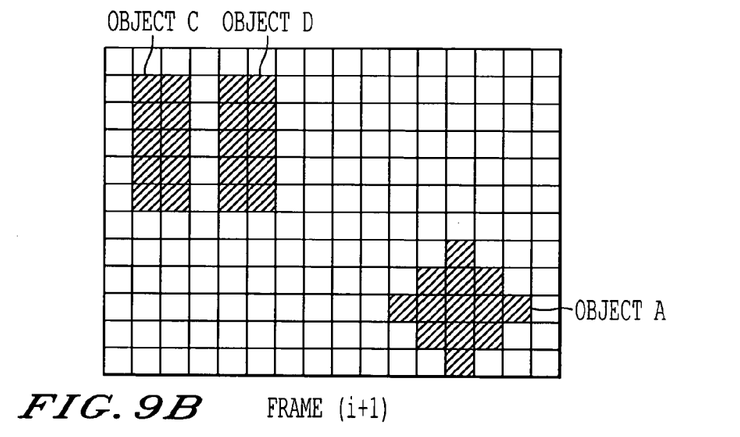
Figure 9C:
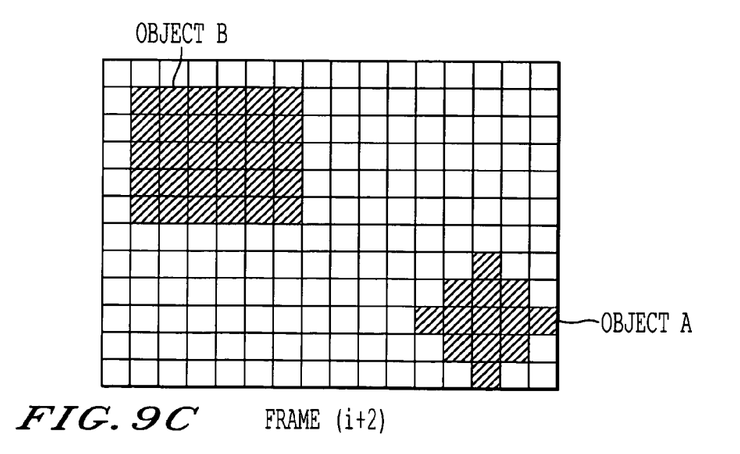

FIG. 8 is a flow chart of estimation processing of affine transformation coefficient according to method 3. First, as for a plurality of frames, each frame is divided into areas each of which includes similar moving vectors in the same way as in method 2 (step 601). Next, the transformation coefficient is estimated to approximate the moving of each area by affine transformation model (step 602). Furthermore, by using a position, the moving vector, and the transformation coefficient of each area, corresponding areas among the plurality of frames are determined (step 603). Then, in the same way as in method 2, the areas in each frame are clustered (step 604). If classification of one area of one frame is different from classification of corresponding area of other frames, the classification of the one area of the one frame is corrected to coincide with the classification of the corresponding area of the other frames (step 605). In short, as for each corresponding area in the plurality of frames, the classification to which a largest number of corresponding areas belong is decided as the correct clustering result. For example, as shown in FIGS. 9A, 9B, and 9C, assume that oblique line part of left upper position on two frames (i) and (i+2) are clustered as object B and two oblique line parts of left upper position on frame (i+1) is respectively clustered as object C and object D. However, by the left upper position among three frames (i)(i+1)(i+2), two objects C and D corresponds to object B. Therefore, two oblique line parts (objects C, D) on frame (i+1) is corrected as the object B. Last, a largest clustered area in each frame is decided as the background area (step 606), and the transformation coefficient 607 of the background area is calculated from the largest clustered area. In this method 3, even if the background area is temporarily smaller than another clustered area in one frame, the background area is correctly decided. In the above example, the affine transformation is used as the transformation model to estimate the background movement. However, other transformation models such as transparent transformation may be used.

Figure 10A:
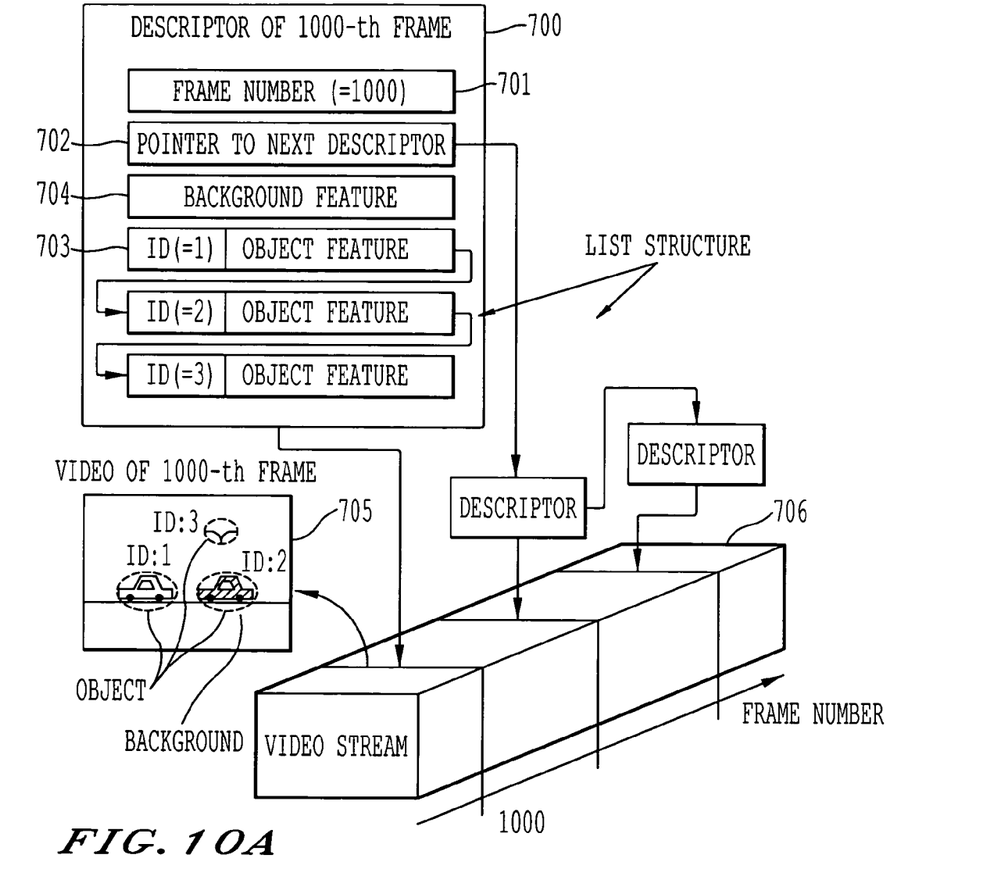
FIGS. 10A, 10B, and 10C are schematic diagrams showing feature data of the object and the background as descriptor.
Figure 10B:
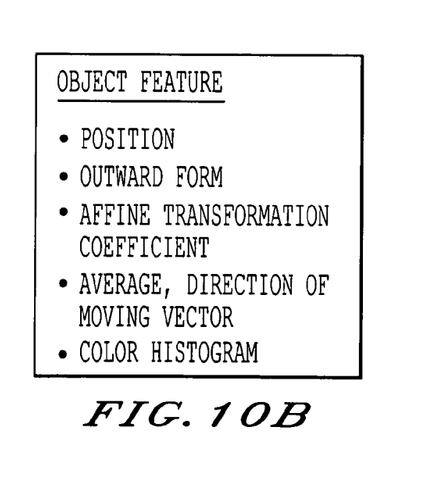
Figure 10C:
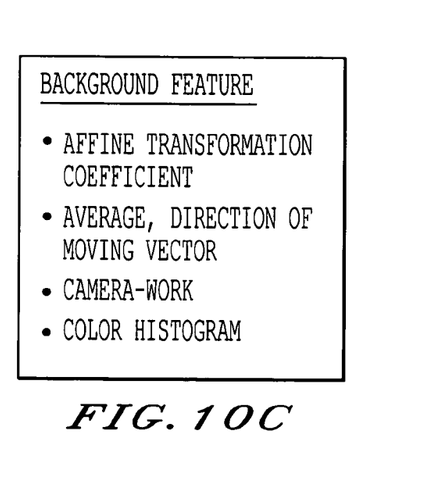

Next, by referring to FIGS. 10A–C, feature data representation in descriptor for the object and the background at step 106 in FIG. 1 is explained. For example, in FIG. 10A, the descriptor 700 of three objects in video 705 of 1000-th frame is shown. This descriptor 700 includes a frame number 701 corresponding to the frame in video stream 706, the feature data 703 of object and the feature data 704 of the background. The descriptor 700 is linked to next descriptor by list structure using a pointer 702. The feature data 703 of object includes at least a position, an outward form (size) and a moving information of the object. Concretely, as shown in FIG. 10B, the feature data 703 of the objects includes various kinds of information. In this example, the position, the outward form, affine transformation coefficient, an average and a direction of the moving vector, and a color histogram are included. In this case, the outward form of the object may be approximated by simple figure such as an ellipse or a rectangle. The affine transformation coefficient is estimated in case the movement of the object is approximated by affine transformation model. The average of the moving vector is an average of scale of the moving vector in the object. In case the color information of the object is obtained, the color histogram of the object area is used as the feature data. As for the object movement, either the moving information from which the background movement is eliminated or the moving information from which the background movement is not eliminated may be recorded. As shown in FIG. 10A, if a plurality of objects exist in one frame, a unique ID number is assigned to the feature data of each object. The feature data of each object (ID 1, 2, 3) is linked by list structure. By using the list structure, addition and deletion of the feature data of object are easily executed. As for the feature data of background 704, as shown in FIG. 10C, the affine transformation coefficient, an average and a direction of moving vector, a camera-work, and a color histogram are included. The camera-work is a kind of operation of the camera such as movement, pan, and zoom.

Figure 11:
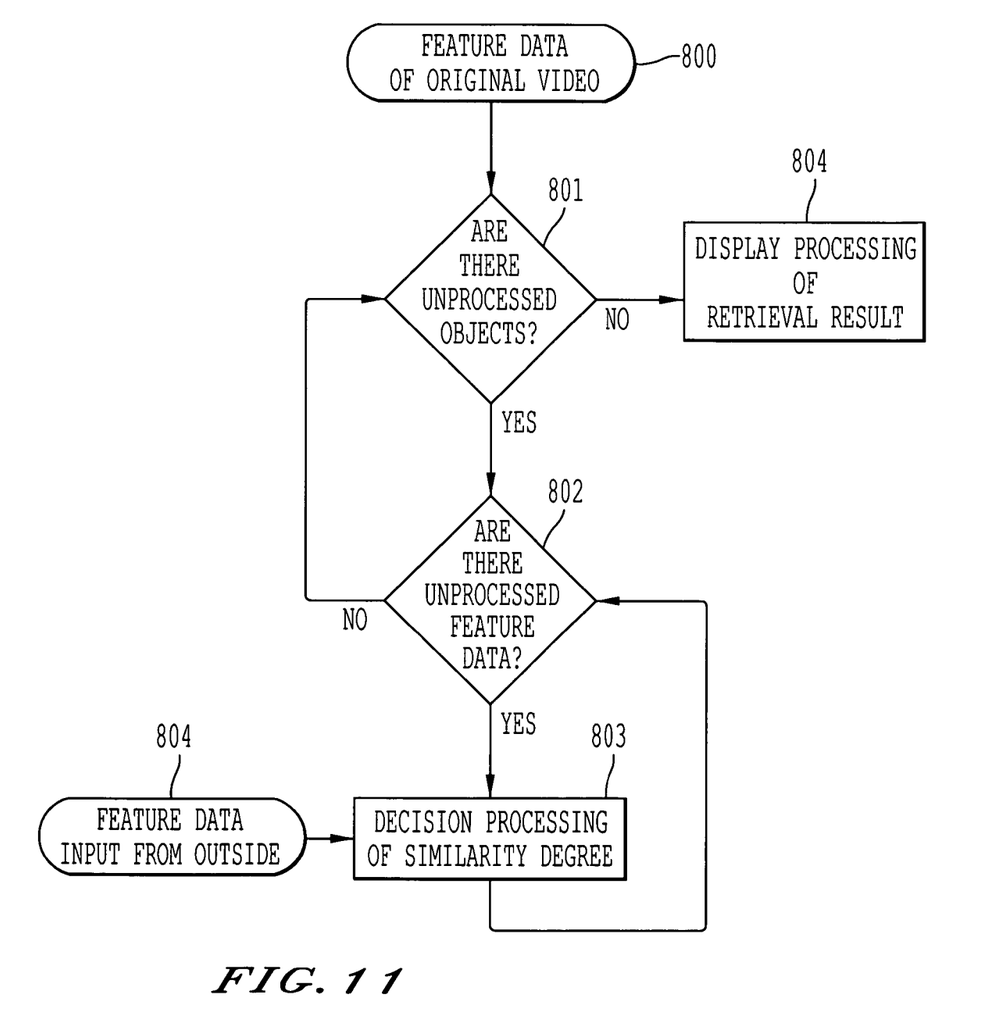
FIG. 11 is a flow chart of processing of retrieving object in the first embodiment.

Next, FIG. 11 is a flow chart of decision processing of similarity decision at step 108 in FIG. 1. In the decision processing of similarity degree, the feature data 800 of each object in the original video data is compared with the feature data 804 inputted from outside in order. The feature data 804 may be directly inputted as numerical values or as feature data extracted from video. If the object includes plural kinds of feature data, the similarity degree for each feature data is calculated (step 803). As for the comparison between the feature data 800 in original video data and the feature data 804 inputted from outside, a suitable method is used based on kind of the feature data. For example, in case the feature data is the color histogram, a difference of each element in histogram is used. In case two objects to be compared include different kinds of the feature data, only one kind of the feature data commonly included in the two objects is compared. When retrieval of all feature data of all objects is completed at steps 801 and 802, the retrieval result of the object is displayed (step 805) and this processing is completed.

Figure 12:
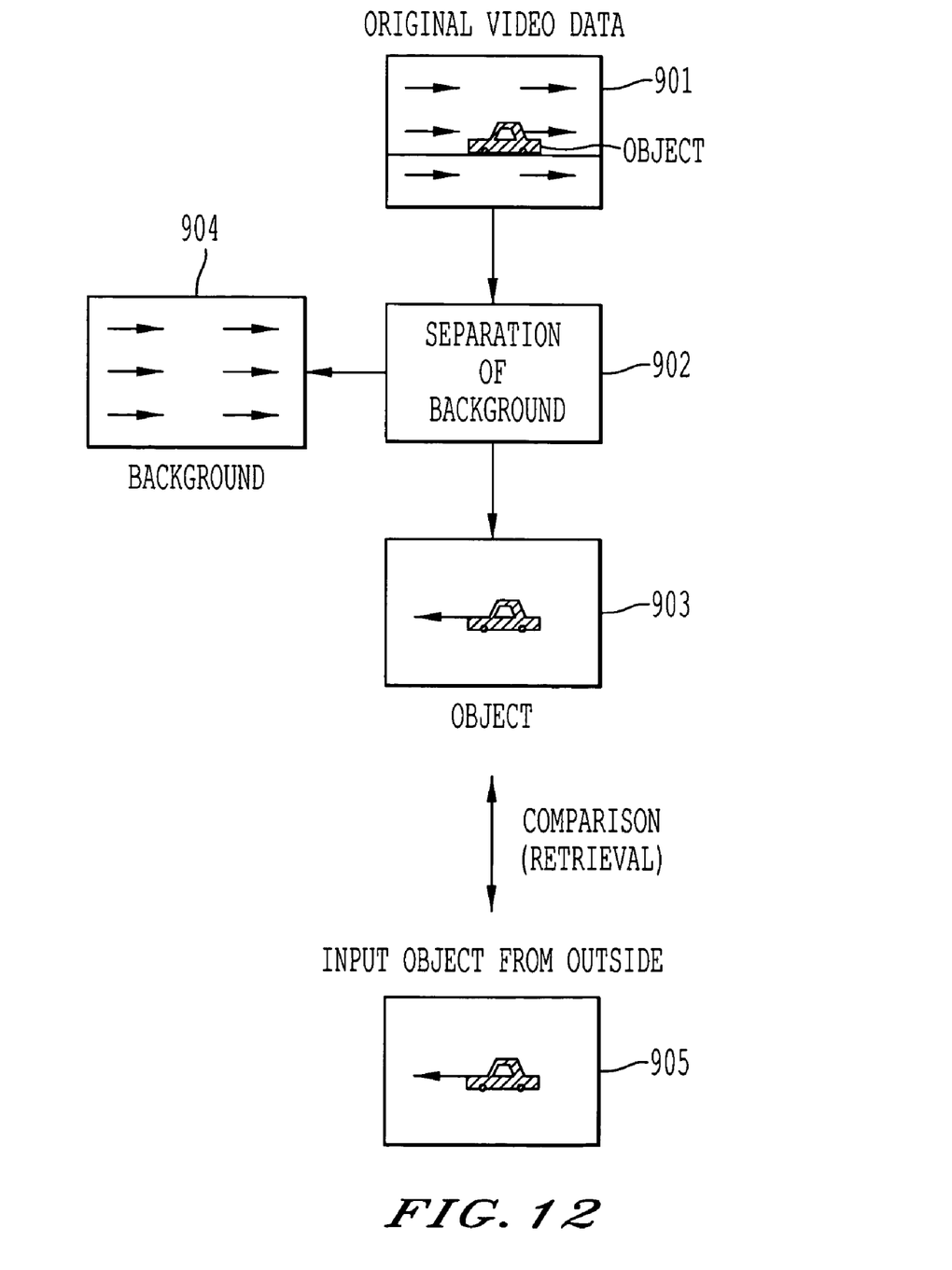
FIG. 12 is a schematic diagram showing elimination of the camera work from the video in the object retrieval processing.

In case of comparison processing of the moving of two objects, the background movement is eliminated using the feature data of the background. FIG. 12 is a schematic diagram showing elimination of the background movement from the video to be compared. As shown in FIG. 12, original video data 901 is taken by a moving camera to pursue the object moving to the left. However, in a frame of the video data 901, the object stands still and the background moves to the right. In order to retrieve the object moving to the left from the video data 901, if the object data 905 moving to the left is input from outside, the feature data of the object in the video data 901 is not matched with the input object data 905 because the object in the video data 901 stands still. However, in the present invention, the feature data of object and the feature data of background are previously recorded as a descriptor. Accordingly, by using the moving of the background, the moving background 904 by the camera-work is eliminated from the video data 901 by separation processing 902. As a result, the object data 903 moving to the left in the video data is detected. In short, a difference between the feature data of the object and the feature data of the background is calculated as separation processing 902 in order to detect the object 903 only. By comparing the detected object 903 with the input object 905, the object matched with the input object 905 is retrieved from the original video data 901, or a frame including the object matched with the input object 905 is retrieved from the original video data 901. In this case, if the difference data is previously recorded in the descriptor as mentioned-above, the separation processing 902 is not necessary.

Figure 13:
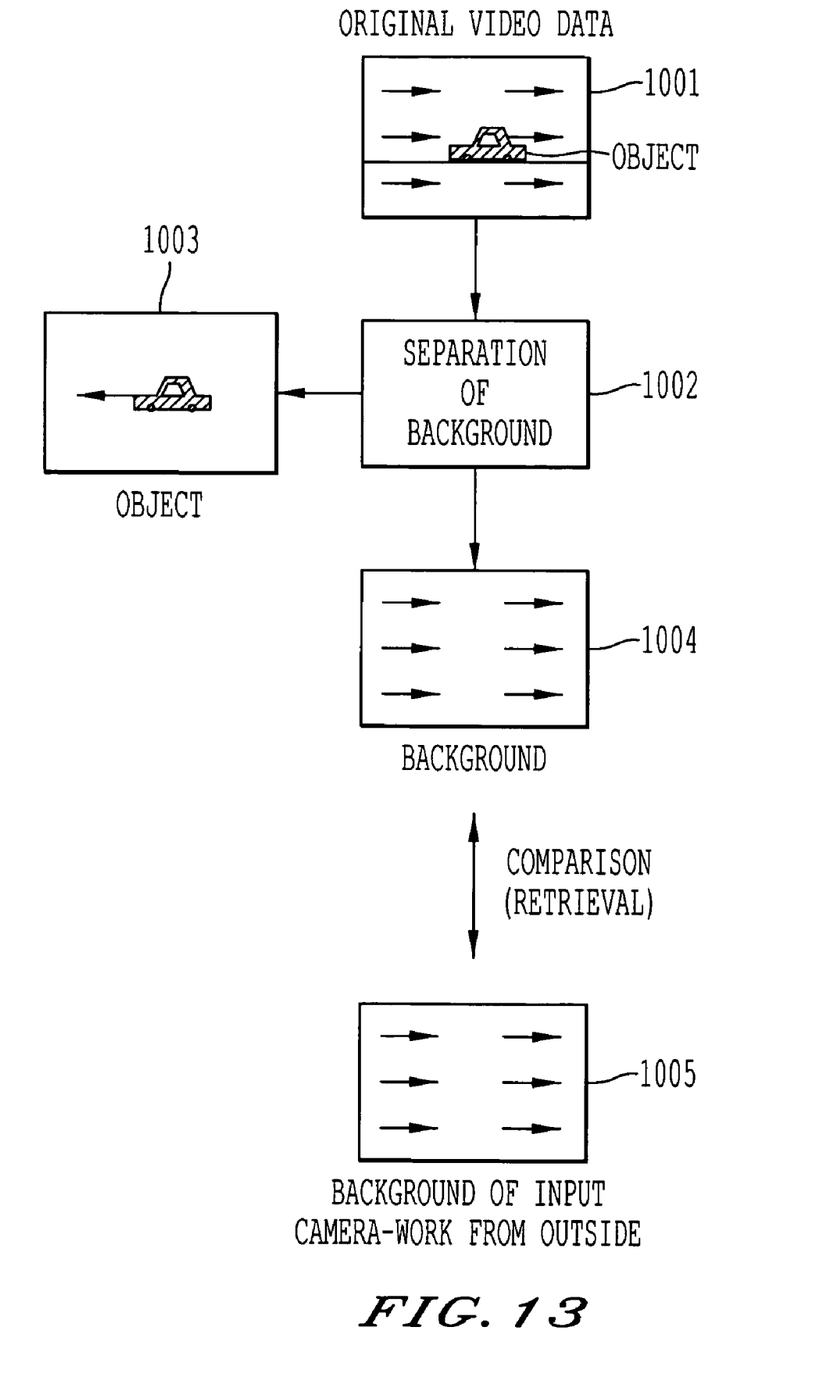
FIG. 13 is a schematic diagram showing retrieval of the frame using the camera-work matched with an input camera-work in the object retrieval processing.

FIG. 13 is a schematic diagram showing retrieval of the frame using the camera-work matched with an input camera-work according to the present invention. As shown in FIG. 13, the feature data of object 1003 is eliminated from the feature data of original video data 1001 by separation processing 1002 in order to detect the background 1004 moved by the camera work. The detected background data 1004 is compared with the input background data 1005 moved by the camera-work. As a result, a frame matched with the camera-work of the input background data 1005 is retrieved from the original video data 1001. In other words, the retrieved frame is decided to be taken by the camera-work of the input background data 1005 when the original video data 1001 is inputted by the camera. In the same way as in FIG. 12, if the difference data is previously recorded in the descriptor, the separation processing 1002 is not necessary.

Figure 14:
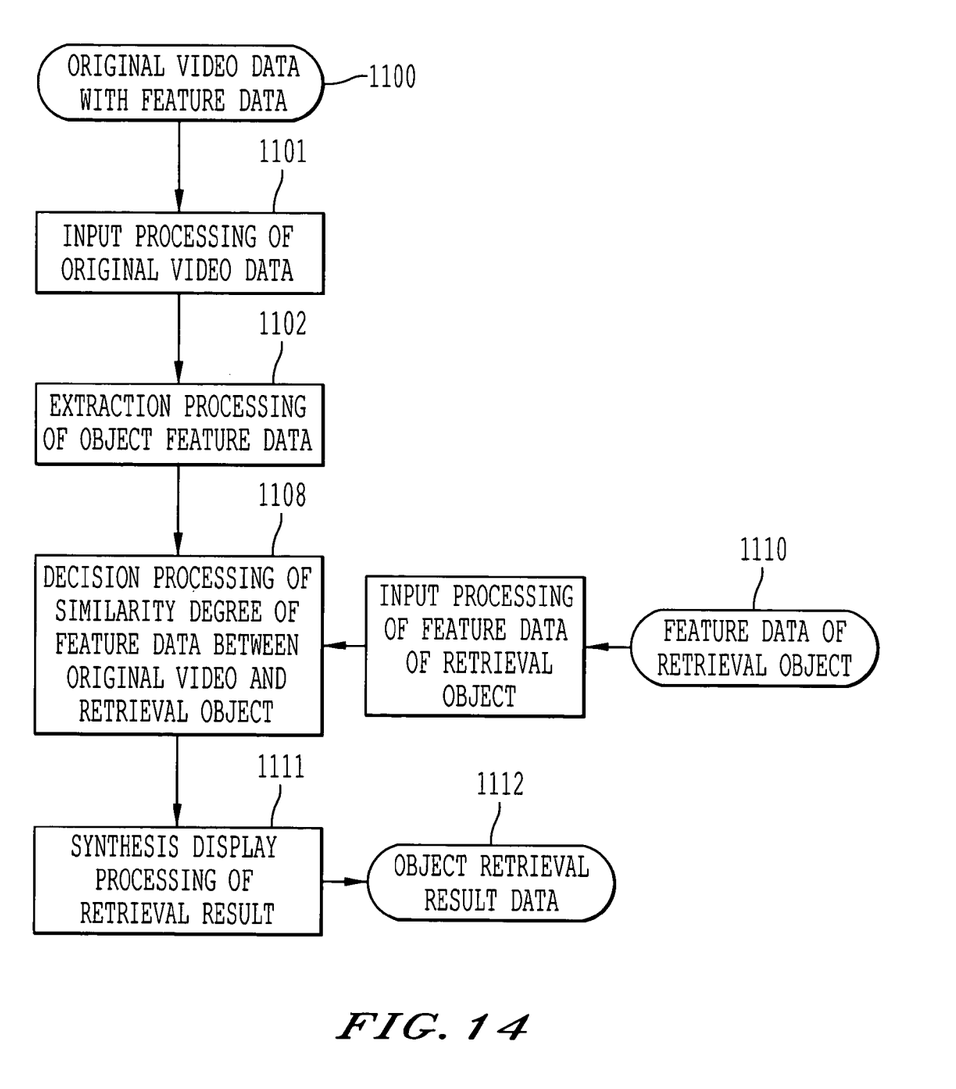
FIG. 14 is a flow chart of processing of the video retrieval system according to a second embodiment of the present invention.

FIG. 14 is a flow chart of processing of the video retrieval system according to a second embodiment of the present invention. In the second embodiment, instead of detection of the object from the video data in the first embodiment, the original video data 1100 with the feature data analyzed previously is inputted (step 1101). The feature data of the object is extracted from the input feature data (step 1102). In the same way as in the first embodiment, a similarity degree between the feature data of the original video data 1100 extracted at step 1102 and the feature data 1110 of the retrieval object inputted at step 1109 is calculated as decision processing (step 1108). The retrieval result is synthetically displayed as the object retrieval result data 1112 (step 1111).

Figure 15:
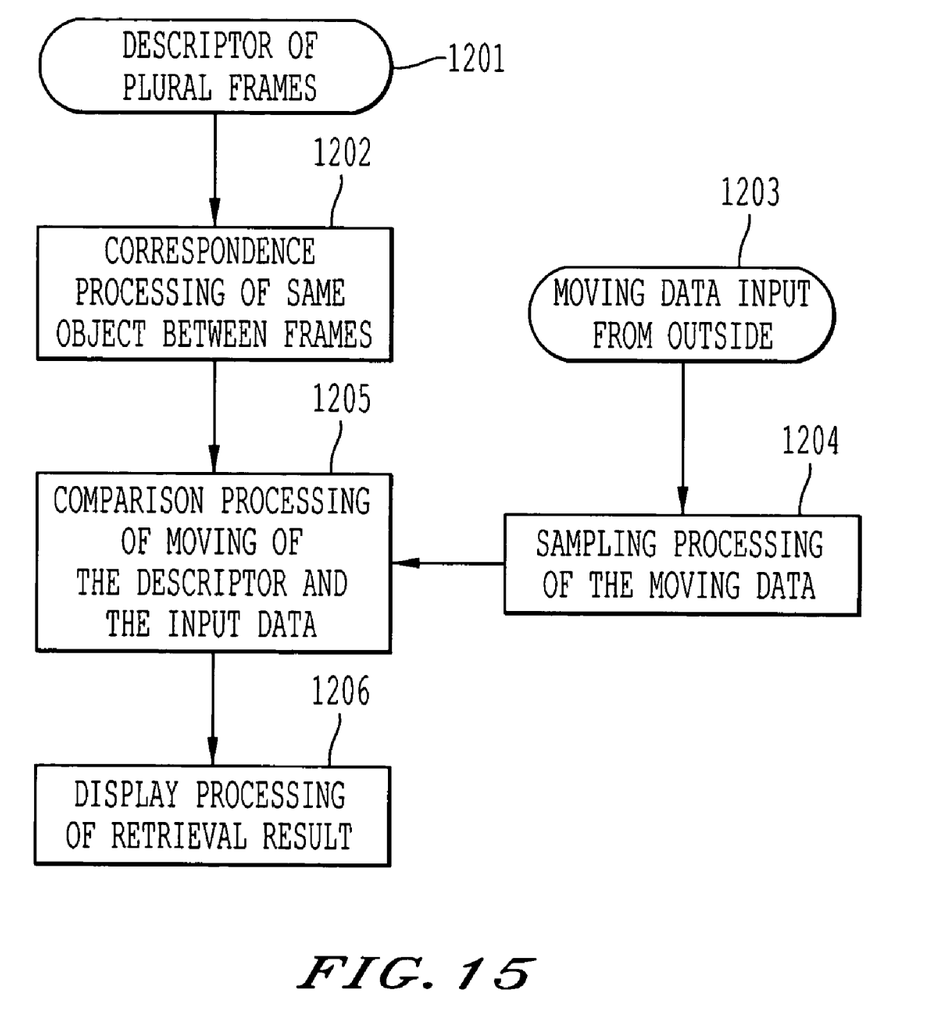
FIG. 15 is a flow chart of processing of the video retrieval system according to a third embodiment of the present invention.

FIG. 15 is a flow chart of processing of the video retrieval system according to a third embodiment of the present invention. In the third embodiment, moving data of retrieval object inputted from outside is compared with feature data in a plurality of descriptors. In order to retrieve the object moving in time series, correspondence processing of same object is executed for objects included in the plurality of descriptors 1201 (step 1202). On the other hand, as for the moving data 1203 of retrieval object inputted from outside, sampling processing to extract the moving data at an interval equal to frame interval corresponding to the descriptor 1201 is executed (step 1204). Then, each of the sampled moving data inputted from outside is compared with feature data of object of corresponding descriptor (step 1205). The frame including the object matched with the sampled moving data is displayed as the retrieval result (step 1206).

Figure 16:
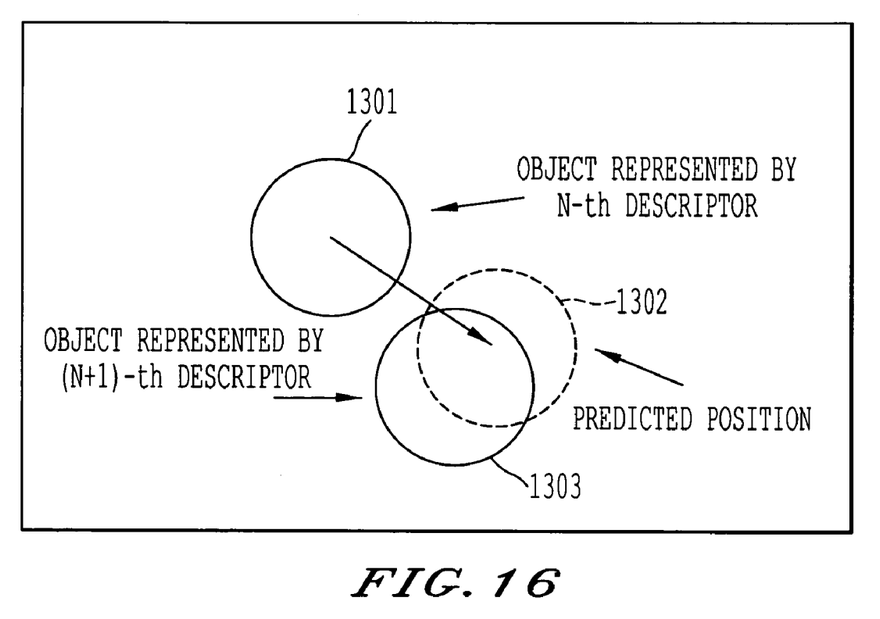
FIG. 16 is a schematic diagram showing correspondence of same object between two successive frames in the third embodiment.

FIG. 16 is a schematic diagram showing correspondence of same object between two successive frames. The correspondence processing of the object of two successive frames represented in descriptors 1201 at step 1202 in FIG. 15 is explained. As shown in FIG. 16, by using the feature data (position and moving information) of the object 1301 in one frame represented by N-th descriptor, a predicted position 1302 of the object 1301 in other frame represented by (N+1)-th descriptor is calculated. Then, actual object 1303 nearest to the predicted position 1302 is detected from the other frame represented by (N+1)-th descriptor. This actual object 1303 is decided to correspond to the object 1301.

Figure 17:
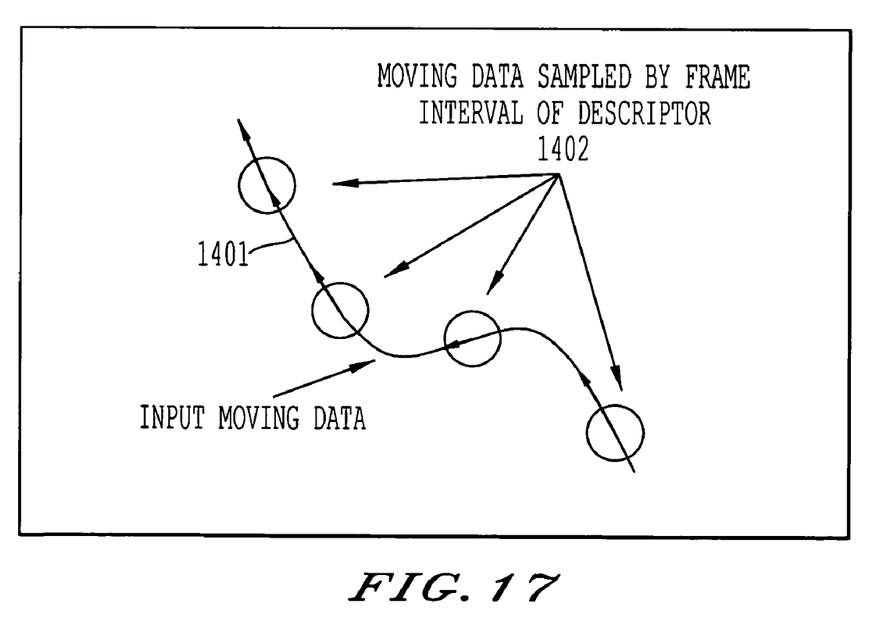
FIG. 17 is a schematic diagram of sampling processing of moving data input from outside in the third embodiment.

FIG. 17 is a schematic diagram of sampling processing of the moving data input from outside. The sampling processing of the moving data 1203 inputted from outside at step 1204 in FIG. 15 is explained. In FIG. 17, the moving data 1401 inputted from outside is continuous moving data such as drawing curved line. This moving data 1401 itself is not compared with the feature data (position and moving information) of the object represented by a plurality of descriptions. Each descriptor is dispersed data added to one frame at each predetermined number of frames (frame interval) in the video stream. Therefore, the moving data 1401 is sampled by the frame interval between two successive descriptors as shown in FIG. 17. Then, each of the sampled moving data 1402 is compared with the feature data of object in corresponding descriptor.

A memory can be used to store instructions for J performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples only, with the true scope and ing indicated by the following

What is claimed is:

1. A video data description method, comprising:
   extracting feature data of a predetermined object and feature data of a background area from a frame of in input video;
   describing the feature data of the predetermined object and the feature data of the background area as a descriptor of the frame, the feature data of the predetermined object including an affine transformation coefficient of an area of the predetermined object, wherein the affine transformation coefficient is estimated based on movement of the predetermined object, which is approximated by an affine transformation model; and
   attaching the descriptor to the frame.

2. The video data description method according to claim 1, wherein the describing step comprises:
   describing a difference between the feature data of the predetermined object and the feature data of the background area as the descriptor.

3. The video data description method according to claim 1, wherein the feature data of the predetermined object includes at least position, outward form, and moving information of the object, and
   wherein the feature data of the background area includes at least moving information of the background area.

4. The video data description method according to claim 1, wherein the descriptor includes a frame number, a pointer to a next descriptor, the feature data of the background area, and the feature data of each object in the frame.

5. The video data description method according to claim 4, wherein the descriptor is created from a corresponding frame at an interval of a predetermined number of frames in the input video.

6. The video data description method of claim 1, wherein the feature data of the predetermined object includes average and direction of a moving vector.

7. The video data description method of claim 1, wherein the feature data of the background area includes at least one of an affine transformation coefficient of the background area and camera-work information describing an operation of a camera used for the input video.

8. A computer readable memory containing computer readable instructions, comprising:
   instruction means for causing a computer to extract feature data of a predetermined object and feature data of a background area from a frame of an input video;
   instruction means for causing a computer to describe the feature data of the predetermined object and the feature data of the background area as a descriptor of the frame, the feature data of the predetermined object including an affine transformation coefficient of an area of the predetermined object, wherein the affine transformation coefficient is estimated based on movement of the predetermined object, which is approximated by an affine transformation model; and
   instruction means for causing a computer to attach the descriptor to the frame.

9. The computer readable memory of claim 8, wherein the feature data of the predetermined object includes average and direction of a moving vector.

10. The computer readable memory of claim 8, wherein the feature data of the background area includes at least one of an affine transformation coefficient of the background area and camera-work information describing an operation of a camera used for the input video.

* * * * *